United States Patent
Canedo et al.

(10) Patent No.: US 11,170,028 B2
(45) Date of Patent: Nov. 9, 2021

(54) PREDICTIVE GRAPH QUERY SYSTEM FOR AUTOMATION ENGINEERING SYSTEMS

(71) Applicant: Siemens Aktiengesellschaft, Munich (DE)

(72) Inventors: Arquimedes Martinez Canedo, Plainsboro, NJ (US); Gustavo Arturo Quiros Araya, Princeton, NJ (US); Georg Muenzel, Plainsboro, NJ (US); Elisabeth Heindl, Cadolzburg (DE); Jörg Neidig, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 107 days.

(21) Appl. No.: 16/281,364

(22) Filed: Feb. 21, 2019

(65) Prior Publication Data

US 2020/0272644 A1    Aug. 27, 2020

(51) Int. Cl.
*G06F 16/00* (2019.01)
*G06F 16/28* (2019.01)
*G06N 20/00* (2019.01)
*G06F 16/248* (2019.01)
*G06F 16/901* (2019.01)

(52) U.S. Cl.
CPC .......... *G06F 16/288* (2019.01); *G06F 16/248* (2019.01); *G06F 16/9024* (2019.01); *G06N 20/00* (2019.01)

(58) Field of Classification Search
CPC .. G06F 16/248; G06F 16/288; G06F 16/9024; G06N 20/00; G06Q 10/06
See application file for complete search history.

(56) References Cited

U.S. PATENT DOCUMENTS

| | | | |
|---|---|---|---|
| 2003/0220906 A1* | 11/2003 | Chickering | G06N 7/005 |
| 2009/0027392 A1 | 1/2009 | Jadhav | |
| 2014/0280224 A1* | 9/2014 | Feinberg | G06F 16/9024 |
| | | | 707/748 |
| 2016/0311113 A1 | 10/2016 | Markey et al. | |
| 2017/0099183 A1* | 4/2017 | Vaidyanathan | G05B 19/0426 |
| 2018/0165554 A1* | 6/2018 | Zhang | G06K 9/6256 |
| 2018/0247073 A1* | 8/2018 | Kreutzer | G06F 16/9535 |
| 2019/0158309 A1* | 5/2019 | Park | H04L 12/2827 |
| 2019/0171669 A1* | 6/2019 | Patankar | G01M 17/00 |

FOREIGN PATENT DOCUMENTS

EP    3086189 A2    10/2016

OTHER PUBLICATIONS

GraphQL "Introduction to GraphQL" https://graphql.org/learn/ Accessed Jan. 26, 2019.

(Continued)

*Primary Examiner* — Dinku W Gebresenbet

(57) ABSTRACT

Graph databases directly relate data items in the data store with edges that represent relationships between the data items. The relationships link the data items together and often permit complex sets of related data items to be retrieved with a single operation. New query systems and techniques for graph databases provide prediction of non-explicit connections between data items that further enhances the efficiency and utility of graph databases, as well as extend their industrial applications.

20 Claims, 6 Drawing Sheets

(56) References Cited

OTHER PUBLICATIONS

GraphQL "Queries and Mutations" https://graphql.github.io/learn/queries/ Accessed Jan. 26, 2019.
Joulin, Armand, et al. "Fast Linear Model for Knowledge Graph Embeddings." arXiv preprint arXiv:1710.10881 (2017). pp. 1-8.
Neo4j "Neo4j Cypher Refcard 3.5" https://neo4j.com/docs/cypher-refcard/current/ Accessed Jan. 26, 2019.
W3C Recommendation "SPARQL Query Language for RDF" W3C Recommendation Jan. 15, 2008. https://www.w3.org/TR/rdf-sparql-query/ Accessed Jan. 26, 2019.
EP Search Report of Exam dated Jul. 23, 2020; Application No. 20158177.4-1222; 8-pages.

\* cited by examiner

PREDICTIVE GRAPH QUERY SYSTEM FOR AUTOMATION ENGINEERING SYSTEMS

TECHNICAL FIELD

This disclosure relates to database systems. In particular, this disclosure relates to query enhancements for graph databases.

BACKGROUND

Graph databases directly relate data items in the data store with labeled edges that represent relationships between the data items. The relationships link the data items together and often permit complex sets of related data items to be retrieved with a single operation. Improvements in query systems and techniques for graph databases will further enhance their efficiency and utility, as well as extend their industrial applications.

DETAILED DESCRIPTION

Important technical problems pose a challenge to efficient storage and retrieval of data elements in graph databases. As examples, these technical problem include establishing and finding, between the data elements, important relationships that are not always obvious, clear, or well defined. The technical problems further include efficiently retrieving such related data elements from the graph database. The systems and techniques described below solve these and other technical problems. For the purposes of explanation, the systems and techniques are described with respect to an example industrial automation environment where subcomponent relationships exist (but may not be explicitly defined) for devices such as programmable logic controllers (PLCs) and their constituent parts. Note however that the systems and techniques may be applied to any environment and technological field.

Figure 1:
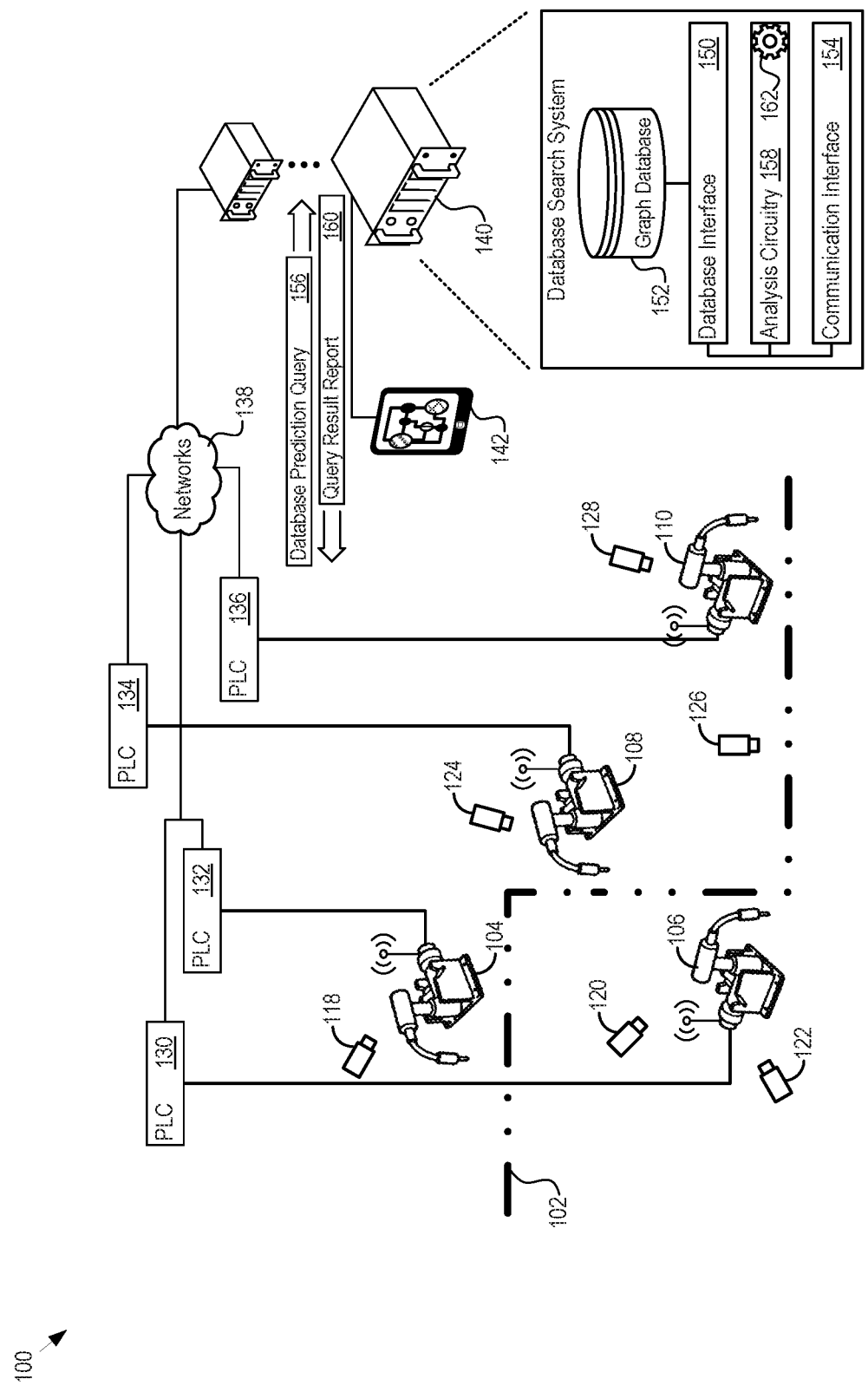
FIG. 1 shows an example industrial automation environment.

FIG. 1 shows an example industrial automation environment 100. In this example, the automation environment 100 includes an assembly line 102 and multiple manufacturing devices positioned along the assembly line, e.g., the devices 104, 106, 108, and 110. The automation environment 100 also includes sensors, e.g., the sensors 118, 120, 122, 124, 126, and 128 that provide feedback from the environment 100. The manufacturing devices 104-110 may be any type of controlled machine or system, including as just a few examples: robots, mixers, welders, belts, conveyors, lifts, injectors, lathes, milling machines, fixtures, planers, and the like. The sensors 118-128 may be any type of feedback device, including as just a few examples: cameras, microphones, current sensors, voltage sensors, rotation sensors, vibration sensors, rpm sensors, pressure sensors, touch sensors, proximity sensors, thermocouples, volume sensors, tilt sensors, temperature sensors, and the like. In FIG. 1, the PLCs 130, 132, 134, and 136 control and monitor the devices 104-110.

FIG. 1 also shows that the PLCs 130-136 communicate over networks 138 with one or more local or remote systems, e.g., the database search system 140 ("system 140"). Engineering clients 142 (e.g., laptops, tablets, and smartphones) communicate over the networks 138 to accomplish a wide variety of tasks. One task is searching databases for component and subcomponent part information for the devices in the automation environment, such as the manufacturing devices 104-110 and the PLCs 130-136, e.g., as part of maintenance or repair operations.

In the example in FIG. 1, the system 140 includes a database interface 150 (e.g., a graph database management system) to a graph database 152. The system 140 further includes a communication interface 154 configured to accept a database prediction query 156 from a query source, such as the engineering client 142. As will be explained in more detail below, the database prediction query 156 generally includes a prediction operator on a specific relationship between graph nodes in the graph database 152.

The system 140 also includes analysis circuitry 158. The analysis circuitry 158 is configured to analyze the graph database 152 to identify a predicted instance of the specific relationship between the graph nodes that is not explicitly defined in the graph database 152. The analysis circuitry 158 also reports the predicted instance of the specific relationship to the query source through the communication interface 154. To the end, the analysis circuitry 158 may transmit a query result report 160 to the engineering client 142 that contains the search result.

Figure 2:
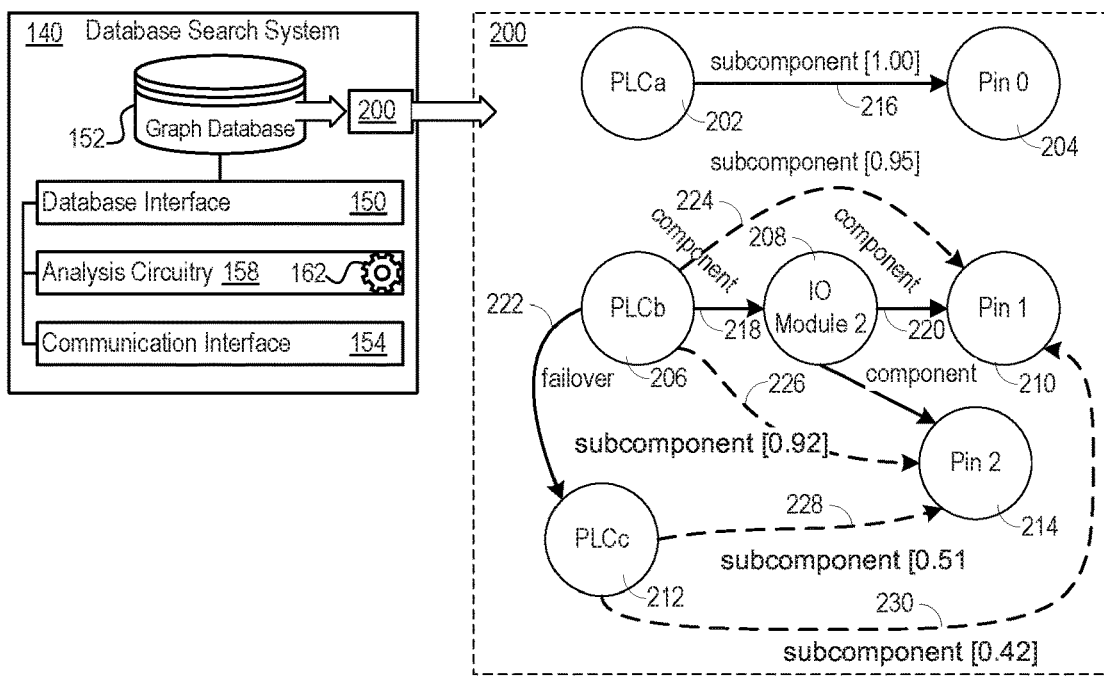
FIG. 2 shows an example graph structure stored in a graph database.
Figure 2:
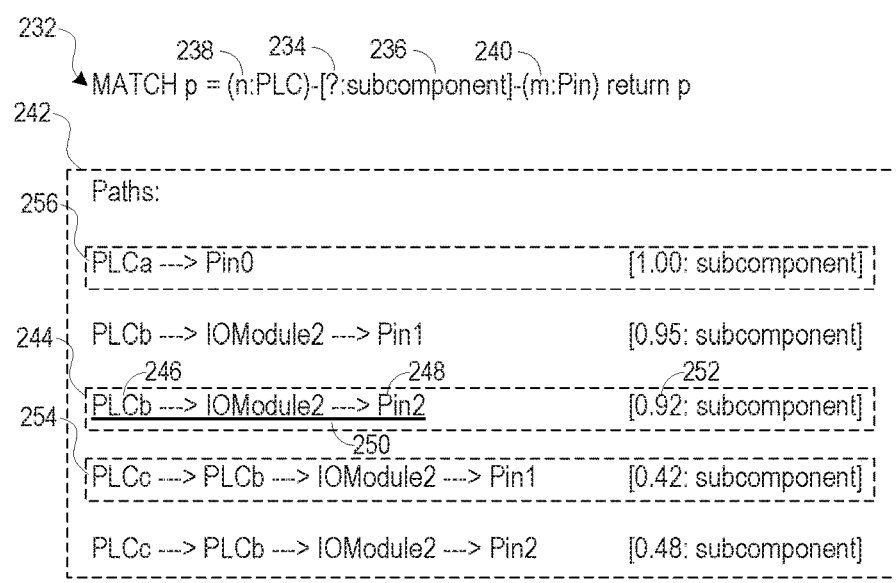

Continuing the example of searching for component and subcomponents of devices in the automation environment 100, FIG. 2 shows an example graph structure 200 that is stored in the graph database 152. The graph structure 200 includes graph nodes, e.g., the graph nodes 202 (labeled PLCa), 204 (Pin 0), 206 (PLCb), 208 (IO Module 2), 210 (Pin 1), 212 (PLCc), and 214 (Pin 2). Solid arrows show explicit relationships defined on edges between the graph nodes. The explicit relationships include the 'subcomponent' relationship 216, the 'component' relationships 218 and 220 and the 'failover' relationship 222. The database search system 140 will locate predicted instances of specific relationships within the graph structure 200. These predicted instances are identified in FIG. 1 as the predicted subcomponent relationship 224, the predicted subcomponent relationship 226, the predicted subcomponent relationship 228, and the predicted subcomponent relationship 199. These predicted instances are not explicitly defined, and would therefore fail to be identified as subcomponent relationships without the systems and techniques described below.

FIG. 2 shows an example database prediction query 232 that includes a prediction operator 234 (in this case the character '?') applied to a specific relationship 236 (in this case, 'subcomponent'). The database prediction query 232 also includes a source node specifier 238 with a source node type of 'PLC' and a destination node specifier 240 with a destination node type of 'Pin'. The analysis circuitry 158 reports predicted instances of the specific relationship to the query source, optionally included a likelihood score that a candidate path matches the specific relationship. In the example shown in FIG. 2, the analysis circuitry 158 reports a search result structure 242 that includes search results that meet the database prediction query 232.

As shown in FIG. 2, the search result 244 in the search result structure 242 includes a graph structure path 250 starting at a source node 246 and ending at a destination node 248. The graph structure path 250 is a path in the graph structure along which the likelihood score 252 applies. The likelihood score 252 indicates that there is a 92% likelihood that the graph structure path 250 (starting at PLCb, through IOModule2, and ending at Pin2) represents a 'subcomponent' relationship between the graph nodes PLCb and Pin 2. Similarly, the search result 254 indicates that there is a 42% likelihood that the graph structure path starting at PLCc, through PLCb, through IOModule2, and ending at Pin1 represents a 'subcomponent' relationship between the graph nodes PLCc and Pin2. The search result 256 indicates that there is a 100% likelihood that there is a 'subcomponent' relationship starting at PLCa and ending at Pin 0. The 100% likelihood follows from the explicitly defined 'subcomponent' relationship 216.

Figure 3:
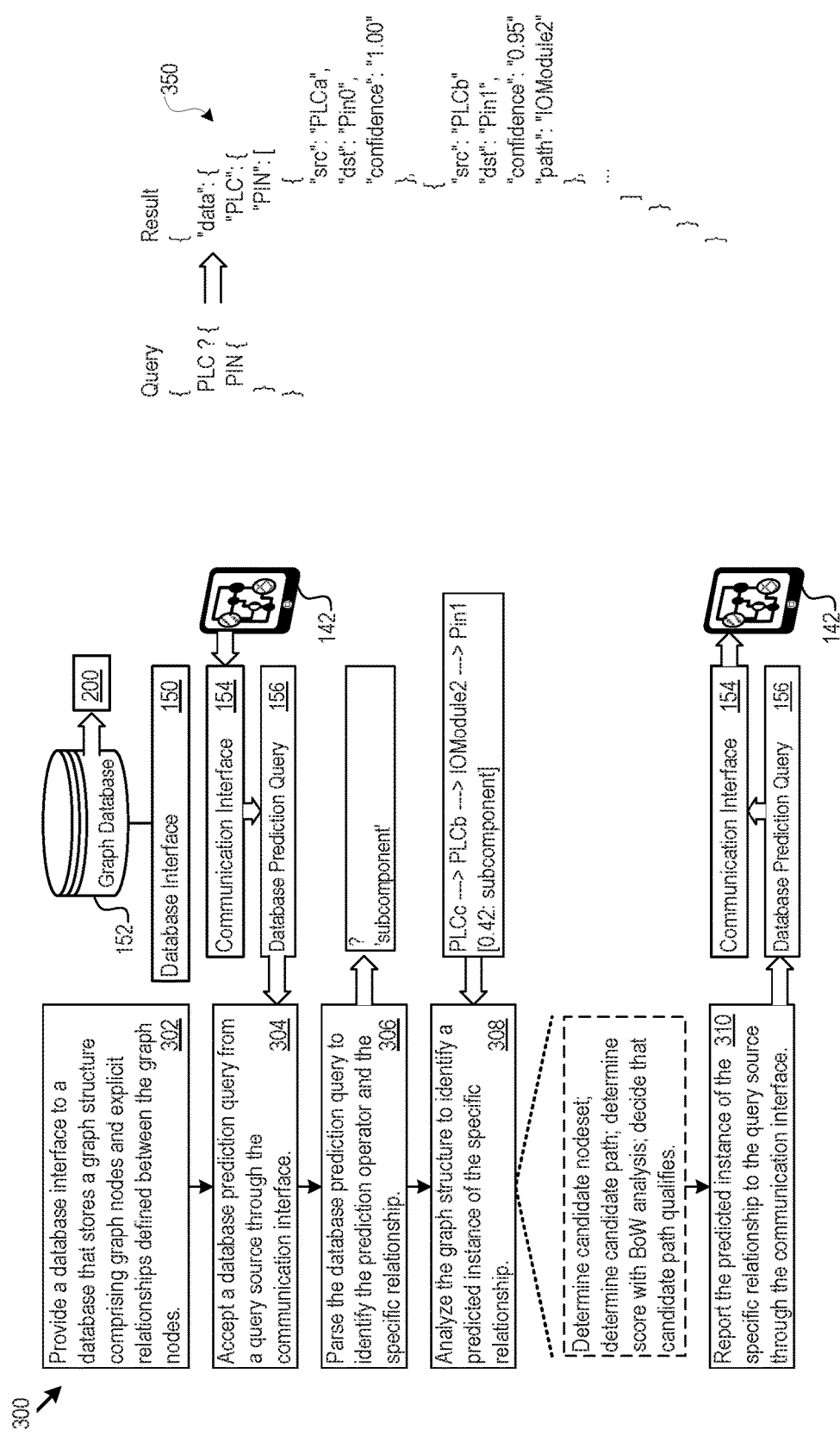
FIG. 3 shows logic for searching a database.

The manner in which the analysis circuitry 158 determines the search results is described in detail below with respect to the analysis logic 300 shown in FIG. 3. The database search system 140 provides a database interface 150 to a database 152 that stores a graph structure comprising graph nodes and explicit relationships defined between the graph nodes (302). The database search system 140 accepts a database prediction query from a query source through the communication interface 154 (304). The database query includes a prediction operator applied to a specific relationship, e.g., 'subcomponent'. The analysis logic 158 parses the database prediction query to identify the prediction operator and the specific relationship (306).

In response to identifying the prediction operator and the specific relationship, the analysis logic 158 analyzes the graph structure in an effort to identify a predicted instance of the specific relationship in the graph structure that is not included in the explicit relationships defined in the graph structure (308). In that regard, the analysis circuitry 158 may determine a candidate nodeset comprising a source node and a destination node among the graph nodes, determine a candidate path for the specific relationship between the source node and the destination node among the graph nodes, and decide that the candidate path qualifies as the predicted instance. In one implementation, the analysis circuitry 158 proceeds by determining a score using a predefined scoring function for the candidate nodeset and determining whether the score exceeds a predefined threshold. The scoring function is configured to provide a probability distribution over predefined relationship types and configured to apply a weighting factor to the probability distribution. The weighting factor may, for instance, comprise a traversal depth parameter corresponding to distance between a source node and a destination node along a candidate graph structure path. In addition, the database search system 140 may predefine a set of known words to represent predetermined relationships (e.g., 'component', 'subcomponent', 'failover') applicable between graph nodes, and the analysis circuitry 158 may train a model 162 based on the known words. Further details are provided below.

Expressed another way, the database search system 140 may include a data repository comprising a graph database 152 storing graph nodes and explicit relationships between the graph nodes chosen from among a set of predefined relationships applicable to the graph nodes. The database search system 140 also includes system circuitry defining a query search interface configured to connect to a query source and query processing logic. The query search interface may include the communication interface 154 and user interfaces for accepting a database prediction query.

The query processing logic (e.g., the analysis circuitry 158) is configured to accept a database prediction query from the query source, with the database query comprising a prediction operator applied to a specific relationship in the set of predefined relationships. The query processing logic is further configured to analyze the graph database 152 to identify a predicted instance of the specific relationship that is not explicitly defined in the graph database. The database search system 140 further includes a reporting interface configured to report the predicted instance of the specific relationship to the query source. The reporting interface may include the communication interface 154 and user interfaces for reporting search results, for instance.

The query processing logic is configured to determine a candidate nodeset comprising a source node and a destination node among the graph nodes, determine a candidate path for the specific relationship between the source node and the destination node in the candidate nodeset, and determine a likelihood score that the candidate path matches the specific relationship. The query processing logic may then generate a search result structure comprising the likelihood score and the candidate path within the graph database from the source node to the destination node along which the score applies. The reporting interface is configured to report the predicted instance by transmitting the search result structure to the query source.

The database search system 140 helps to solve the technical problem of identifying the subcomponents in a PLC network that are not explicitly defined in the graph database 152. In the examples noted above, the only factual information available in the graph are the explicitly defined relationships, e.g., a 'failover' relationship 222 between PLCb and PLCc. The database prediction query helps identify other 'subcomponent' relationships that are not explicit but are inferred through the 'failover' relationship and 'component' relationships between the PLC nodes.

In one implementation, the analysis circuitry 158 performs inferencing using the local neighborhood of the nodes of the type specified in the query. For example, the database prediction query "MATCH p=(n:src_type)-[?:rel_type]-(m:dst_type) return p" is a query concerning nodes of type "src_type" (the source specifier) and their relation to nodes of type "dst_type" (the destination specifier). The analysis circuitry 158 generates a list of nodes in the graph structure 200 whose type is "src_type", 's' in 'S'. For each of these matching nodes, the analysis circuitry 158 traverses their neighbors 'd' in 'D' whose type is "dst_type" with a depth of 'k'. For every candidate nodeset pair (s, d) the analysis circuitry 158 evaluates a scoring function:

$$1/(k-1)*\psi(s,d)$$

that provides the probability distribution over the relationship types in the graph. The analysis circuitry 158 then determines the graph structure paths whose score exceeds a threshold value 'thold':

$$s\text{-->}[rel\_type]\text{-->}d, \text{ where } rel\_type=\arg\max(1/(k-1)$$
$$*\psi(s,d))\text{>thold}$$

Graph Triples Embeddings

The analysis circuitry 158 learns the graph embeddings using, e.g., a multi-class multilabel classifier and modeling (e.g., with the model 162) the co-occurrences of entities and relations with a linear classifier based on a predefined bag-of-words (BoW) as the known words 164. One implementation of the model 162 includes a classifier matrix W, a lookup matrix V for each of the input examples, a function f to compute the probability distribution over the classes, N input examples, a linearized classifier based on a BoW for the n-th input $x_n$, and the $y_n$, label. This model attempts to minimize:

$$-\frac{1}{N}\sum_{n=1}^{N} y_n \log(f(WVx_n))$$

The analysis circuitry 158 may represent the knowledge graph with triples, e.g., subject-relation-object triples (e, r, p). The following $s_r$ scoring function captures the occurrence between the entities and relations. In one implementation, the scoring function is the dot product between the BoW vector representation of dimension 'h' of the pair (e, r) and the target 'p' in:

$$s_r(e,r,p) = \frac{1}{2} \langle v_e + v_p, v_r \rangle$$

During training, the relation 'r' represents the label(s) for the classifier, and the pair (e, p) represents the sample inputs. During inference, the analysis circuitry 158 uses the linear model to predict the labels given a pair (e, p) of entities. The analysis circuitry 158 may encode type hierarchies along with entity identifiers as follows. Take, for example, "PLCa" and "PLCb", two entities of type "PLC". Their encoding is "/PLC/PLCa" and "/PLC/PLCb". The same is applicable to relations and their types. This type-name encoding allows the linear model to embed these strings differently. This helps distinguish between entities with same name but of different class.

The database search system 140 may implement different ways to perform predictive querying. Two examples are (1) through the query language, e.g., Cypher; and (2) through a GraphQL front-end. The same back-end functionality described previously can be used in both. In the query language, the analysis circuitry 158 implements a new prediction operator, e.g., '?'. For example, the query "MATCH p=(n:PLC)-[?:subcomponent]-(m:PIN) return p" reads "predict all the subcomponent relationships between pairs of nodes of type PLC and PIN". In the query results, the analysis circuitry 158 may introduce a new format to report the predicted results. For example, the "PLCc-->PLCb-->IOModule2-->Pin1 [0.48:supercomponent]" indicates that "there is a predicted relationship with confidence 0.48 of type supercomponent between PLCc and Pin1 going through PLCb-->PLCc".

In GraphQL, the database search system 140 may introduce a new prediction operator ('?') to indicate to the back-end to provide a prediction on the types requested by the query. The result provides the expected results with additional information about the prediction specified by the field "confidence", and the path found specified by the field "path". FIG. 2 shows an alternative example search result structure 350 that captures this information as labeled elements in a hierarchical markup language, and is also reproduced in Table 1 below.

TABLE 1

| Query | Result |
|---|---|
| { <br>   PLC ? { <br>     PIN { <br>   } | { <br>   "data": { <br>     "PLC": { <br>       "PIN": [ |

TABLE 1-continued

| Query | Result |
|---|---|
| } | { <br>   "src": "PLCa", <br>   "dst": "Pin0", <br>   "confidence": "1.00" <br> }, <br> { <br>   "src": "PLCb" <br>   "dst": "Pin1", <br>   "confidence": "0.95" <br>   "path": "IOModule2" <br> }, <br> ... <br> ] <br> } <br> } <br> } |

When there is no existing relation between two elements of the query, the database search system 140 may return a warning to the query source, rather than an error. Further, the database search system 140 may then automatically generate predictions about possible relationships and their graph structure paths. Automatically generating predictions instead of simply returning an error helps solve the technical problem of implementing efficient knowledge exploration in complex systems; with the database search system 140, queries can return predictions when other systems would return errors, regardless of the data model underlying the data in the graph database 152.

Personal Engineering Assistant

The increasing complexity of production plants is can greatly complicate the corresponding engineering process. For instance, a responsible engineer may need to gather information from many different sources, make sure the right tools with the right version are used, talk to and coordinate with the right experts, and select the best and most cost-effective hardware to solve the current problem. Described below is a personal engineering system that solves the technical challenges of retaining comprehensive knowledge used in the engineering domain, guiding the engineer through the engineering process, learning with the engineer, and other challenges.

Figure 4:
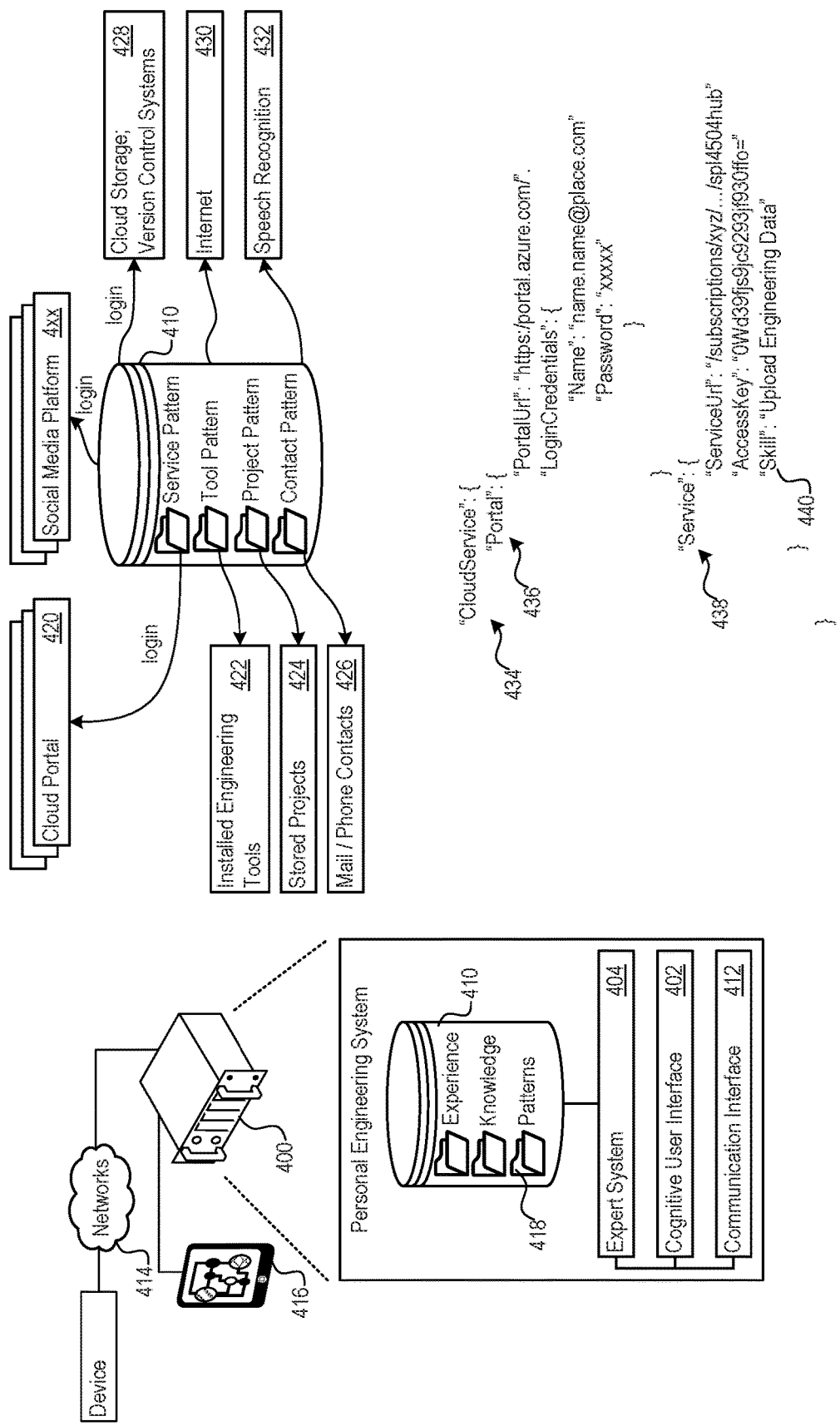
FIG. 4 shows a personal engineering system.

FIG. 4 shows an example implementation of the personal engineering system 400 ("system 400"). The system 400 includes a cognitive user interface 402 and an underlying self-learning expert system 404. The system 400 stores experience data and knowledge data in an experience database 410, e.g., as patterns 418 (described below). A communication interface 412 connects the system 400 over networks 414 to other devices, such as query sources 416. The query source 416 may represent a laptop, tablet, smartphone, personal computer, or other engineering client operated by an engineer working with the system 400. The system 400 may execute the cognitive user interface 402 to render user interfaces on a display associated with the query source 416, in connection with query source 416 interactions with the personal engineering system 400.

In many cases, automation engineers are experts who use many different resources for their work. Many resources are personal, secured by a login id or a license. Other resources are only accessible from a company intranet, or are freely accessible on the Internet. For example, an engineering tool automation portal may use a license manager tool to administrate a bundle of licenses, while a cloud portal like Azure accepts a Windows life ID, and company proprietary intranet tools use a special entitlement service.

The system 400 may execute the expert system 404 to create, modify, and store patterns 418 that help accomplish an engineering goal. The patterns 418 capture engineer experience data, knowledge data, resources, services, and other engineering data in the experience database 410. Examples of patterns shown in FIG. 4 include service patterns which capture pattern components for cloud portals 420, tool patterns which capture pattern components for engineering tools 422, project patterns which capture pattern components for stored projects 424, and contact patterns which capture pattern components for mail/phone contacts 426. Any other patterns may exist in the experience database 410, e.g., to capture pattern components for cloud storage 428, network resources 430, and speech recognition 432.

The patterns may be connected through linking references in order to link related patterns together. For example, a tool pattern describing an engineering tool like an automation portal (e.g., the Siemens (R) totally integrated automation (TIA) portal) may have a linking reference to a cloud storage pattern (e.g., code.website.com) where the automation portal project is stored. As another example, a drawing pattern for creating an engineering project may have a linking reference to a scanning pattern that defines resources and services for scanning a drawing and performing object recognition.

Cloud services are a common example of pay-per-use services, available from many different cloud providers. The system 400 may store the access data of the cloud services in combination with the task to be fulfilled to create a service pattern 434. The service pattern 434 includes a portal pattern component 436 ("Portal") which specifies the uniform resource locator (URL) of the service, and a service pattern component 438 ("Service") which specifies the access data and meaning and purpose of the service, e.g., using the Skill tag 440. Here, the Skill tag 440 indicates that the purpose relates to uploading engineering data to the cloud service through the cloud portal. The portal pattern component 436 and the service pattern component 438 are linked together by virtue of encapsulation in the structure of the service pattern 434 itself. In addition, any pattern may include one or more linking references to other patterns, such as a drawing pattern that includes a linking reference to a scanning pattern.

A pattern may include any number of pattern components of any type. As another example, an engineer also uses personal contacts and domain specific social platforms to talk to other experts. The patterns 418 may capture the URLs, credentials, names, contact numbers and other characteristics of those resources as well, e.g., in contact patterns, using pattern components like those described above.

An engineer typically has a working environment of different tools on a desktop computer. The tools may be free, purchased, or licensed. The tools are often customized with specific integrated development environments (IDEs), plugins, and the like, to provide customized functionality. The system 400 reproduces these customized environments to any selected system and keeps the environment up to date. In that respect, the system 400 may define tool patterns that contains pattern components that specify, e.g., the license keys, download URLs, update servers, actions for which the tools and customizations may be used, and other installation, updating, and usage details.

Over time an engineer works on many engineering projects. The system 400 also stores the project experience and the projects themselves for reuse later in whole or in part. In that respect, the system 400 may define project plans that include pattern components which specify project details such as version control system and credentials, references to tools needed for the project, and other project details. Further, some cognitive services such as speech recognition and machine learning tools are first trained so that they perform well. The system 400 may facilitate using cognitive services by, e.g., maintaining references or pointers to a collection of learned phrases for speech recognition, specified in pattern components in a cognitive service pattern.

Figure 5:
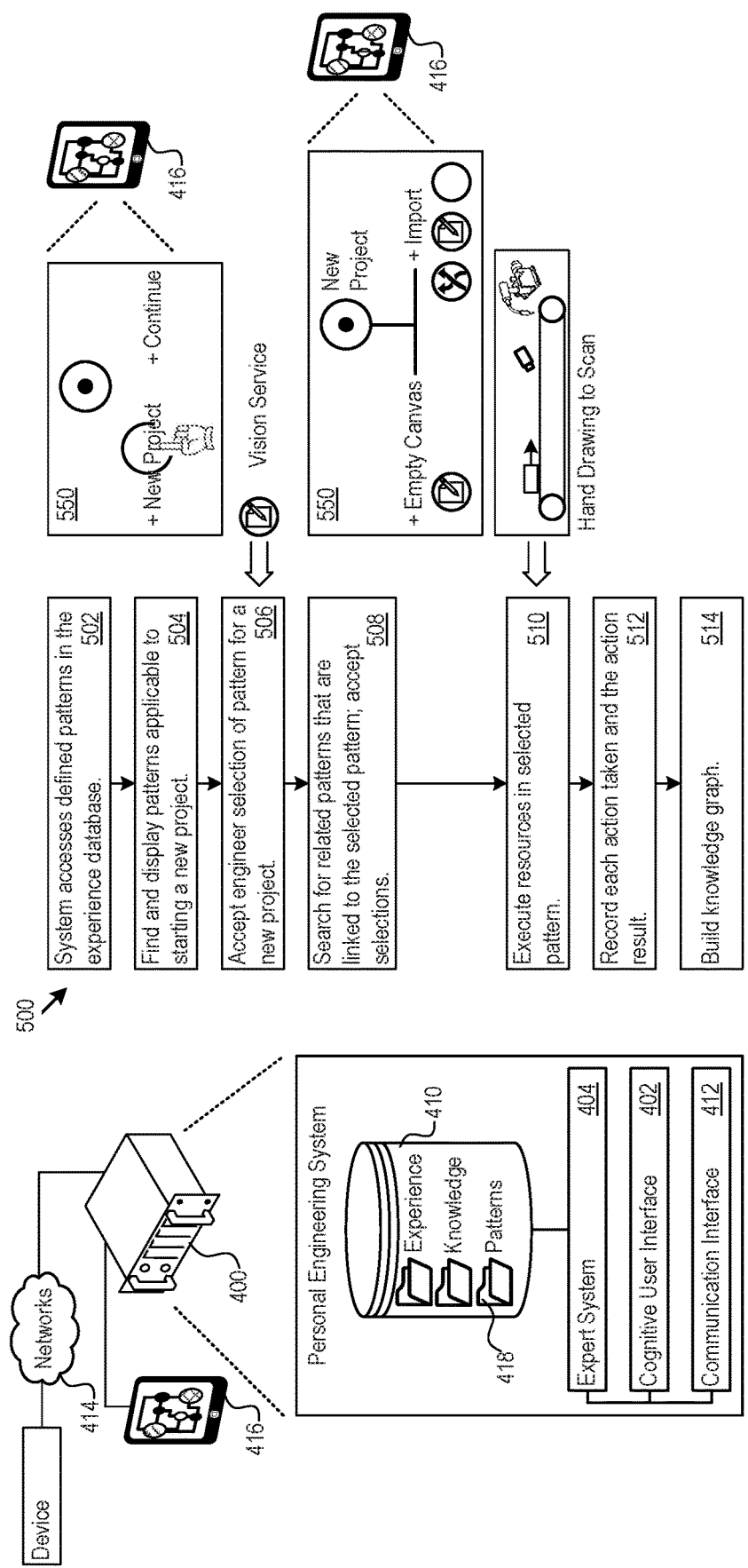
FIG. 5 shows an example of logic that the personal engineering system may follow to guide an engineer.

FIG. 5 shows an example of logic 500 that the personal engineering system 400 may follow to guide an engineer when starting a new engineering project. The cognitive user interface 402 renders a user interface 550 based on information stored as patterns 418 in the experience database 410 (502). In this example, the cognitive user interface 402 renders a user interface 550 for new projects. Through the user interface, the engineer may select whether to continue an existing project (if one exists) or to start a new project.

For a new project, the system 400 identifies which patterns 418 support starting a new project and provides a pattern selection interface to the engineer (504). For instance, there may be a tool pattern for opening an automation portal and a vision pattern that uses a vision service from a cloud provider to interpret an engineering drawing, e.g., a vector, CAD or Scratch drawing. The engineer selects a pattern for the new project (506). In this example, the engineer choses the vision service.

In response to accepting the selection of the pattern, the system 400 searches the database 410 for any related patterns that are linked to the vision service and presents them in the user interface 550 (508). In this example, the system 400 finds a drawing area tool pattern and a scanner tool pattern. The scanner tool pattern specifies the resources and services needed to import drawings (e.g., a URL of the import service and login credentials) in pattern components, and the engineer choses the scanner tool pattern to proceed. In response, the system 400 executes the services defined in the pattern (510), in this case to scan the drawing and perform object recognition of the drawing elements.

The system 400 may execute additional services to facilitate any processing. For instance, the system 400 may execute additional free object recognition services on the drawing if the primary object recognition service did not recognize all of the drawing elements. In addition, the system 400 records each action taken and each action result (512), e.g., in the expert system 404. The system 400 may create a store a knowledge graph that captures the steps for later retrieval and review (514).

As noted above, the system 400 includes the expert system 404 and the cognitive user interface 402. The system thereby 400 reduces the need for manual intervention for expert knowledge and reduces engineering time by making engineering information readily available to the engineer. Expressed another way, the system 400 helps the engineer avoid inefficient processes, such as manually searching for information, and increases the efficiency of the engineer.

Figure 6:
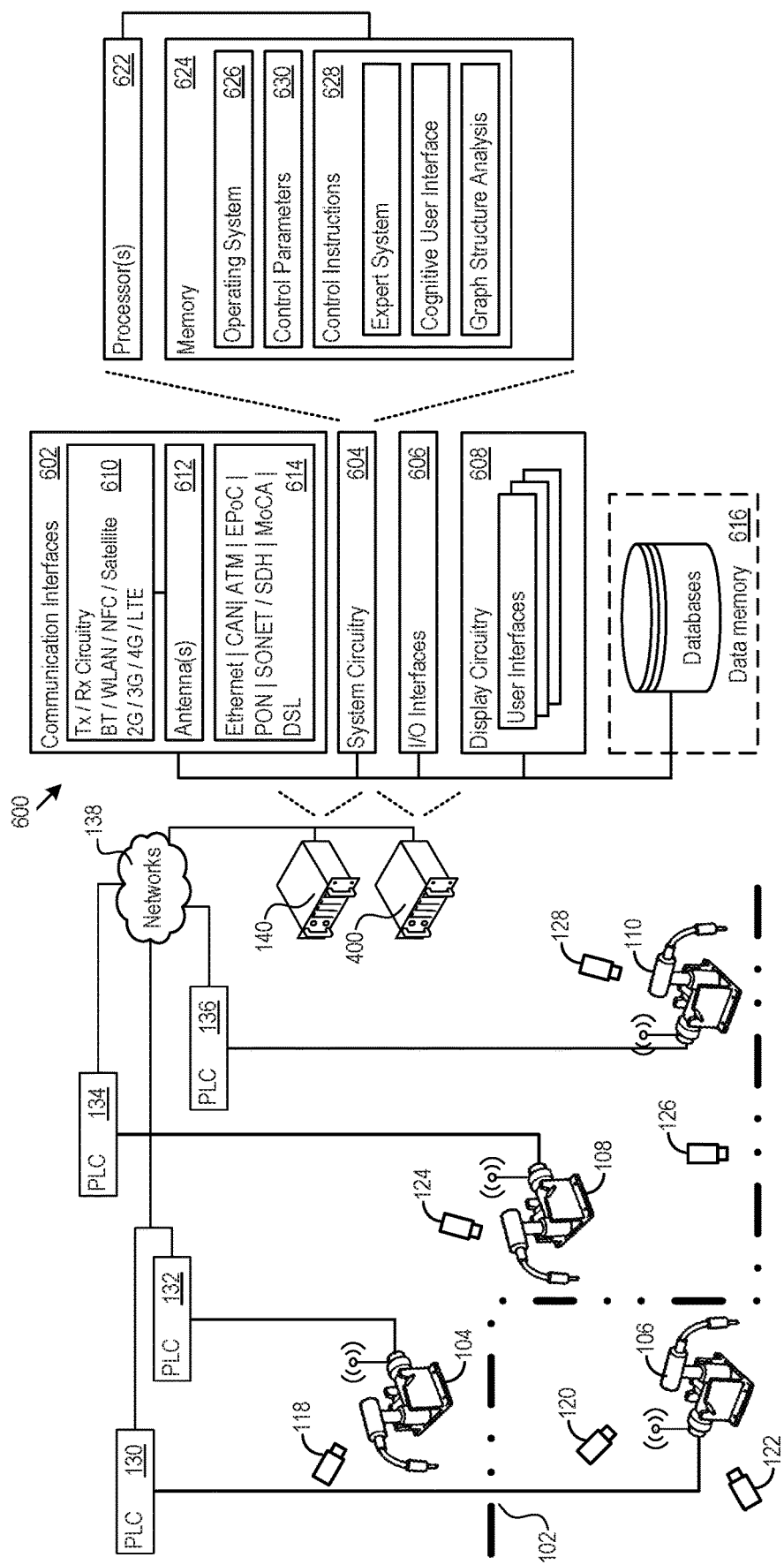
FIG. 6 shows an example system implementation.

FIG. 6 shows an example implementation 600 of the database search system 140 and the personal engineering system 400. The implementation 600 includes communication interfaces 602, system circuitry 604, input/output (I/O) interfaces 606, and display circuitry 608. The system circuitry 604 may include any combination of hardware, software, firmware, or other circuitry. The system circuitry 604 may be implemented, for example, with one or more systems on a chip (SoC), application specific integrated circuits (ASIC), microprocessors, microcontrollers, discrete analog and digital circuits, and other circuitry. The system circuitry 604 is part of the implementation of any desired functionality in the system 140 or the system 400. Accordingly, the system circuitry 604 may implement the logic described above in FIGS. 3 and 5, as examples. The system 140 and system 400 may store and retrieve data from a data memory 916. For instance, the data memory 616 may store the database 152 or the database 410.

The display circuitry 608 and the I/O interfaces 606 may include a graphical user interface, touch sensitive display, voice or facial recognition inputs, buttons, switches, speakers and other user interface elements. Additional examples of the I/O interfaces 906 include Industrial Ethernet, Controller Area Network (CAN) bus interfaces, Universal Serial Bus (USB), Serial Advanced Technology Attachment (SATA), and Peripheral Component Interconnect express (PCIe) interfaces and connectors, memory card slots, and other types of inputs. The I/O interfaces 906 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces.

The communication interfaces 602 may include transceivers for wired or wireless communication. The transceivers may include modulation/demodulation circuitry, digital to analog converters (DACs), shaping tables, analog to digital converters (ADCs), filters, waveform shapers, filters, pre-amplifiers, power amplifiers and/or other circuitry for transmitting and receiving through a physical (e.g., wireline) medium such as coaxial cable, Ethernet cable, or a telephone line, or through one or more antennas. Accordingly, Radio Frequency (RF) transmit (Tx) and receive (Rx) circuitry 610 handles transmission and reception of signals through one or more antennas 612, e.g., to support Bluetooth (BT), Wireless LAN (WLAN), Near Field Communications (NFC), and 2G, 3G, and 4G/Long Term Evolution (LTE) communications.

Similarly, the non-wireless transceivers 614 may include electrical and optical networking transceivers. Examples of electrical networking transceivers include Profinet, Ethercat, OPC-UA, TSN, HART, and WirelessHART transceivers, although the transceivers may take other forms, such as coaxial cable network transceivers, e.g., a DOCSIS compliant transceiver, Ethernet, and Asynchronous Transfer Mode (ATM) transceivers. Examples of optical networking transceivers include Synchronous Optical Networking (SONET) and Synchronous Digital Hierarchy (SDH) transceivers, Passive Optical Network (PON) and Ethernet Passive Optical Network (EPON) transceivers, and EPON Protocol over Coax (EPoC) transceivers.

Note that the system circuitry 604 may include one or more controllers 622, e.g., microprocessors, microcontrollers, FGPAs, GPUs, Intel Movidius™ or ARM Trillium™ controllers, and memories 624. The memory 624 stores, for example, an operating system 626 and control instructions 628 that the controller 622 executes to carry out any functionality described above. Accordingly, the control instructions 628 may implement the logic described above for the expert system 404, cognitive user interface 402, and analysis circuitry 158, e.g., with regard to FIGS. 3 and 5. The control parameters 630 provide and specify configuration and operating options for the control instructions 628.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A method for guiding an engineering project using a database of patterns, the method comprising:
providing a database interface to a database that stores a graph structure comprising graph nodes and explicit relationships defined between the graph nodes, wherein the relationships represent patterns capturing engineering data including engineer experience data, knowledge data, resources, or services;
accepting a database prediction query from a query source through a communication interface, the database query comprising a prediction operator applied to a specific relationship, wherein the database query relates to patterns and pattern components that support the engineering project, including service patterns that capture pattern components for cloud portals, tool patterns that capture pattern components for installed engineering tools, and project patterns that capture pattern components for stored projects;

parsing the database prediction query to identify the prediction operator and the specific relationship in the database query;

in response to identifying the prediction operator and the specific relationship, analyzing, by a linearized classifier, the graph structure to identify a predicted instance of the specific relationship in the graph structure that is not included in the explicit relationships defined in the graph structure; and reporting the predicted instance of the specific relationship to the query source through a communication interface, wherein the predicted instance identifies a pattern component responsive to the database query for guiding the engineering project.

2. The method of claim 1, where:

analyzing comprises:
 determining a candidate nodeset comprising a source node and a destination node among the graph nodes;
 determining a candidate path for the specific relationship between the source node and the destination node among the graph nodes; and
 deciding that the candidate path qualifies as the predicted instance.

3. The method of claim 2, where:

deciding comprises: determining a score for the candidate path; and
determining whether the score exceeds a predefined threshold.

4. The method of claim 3, where:

the database prediction query further comprises a source node specifier and a destination node specifier; and
reporting comprises: returning a search result structure comprising the score, and a graph structure path within the database from the source node to the destination node along which the score and the predicted instance applies.

5. The method of claim 3, where:
applying a predefined scoring function to generate the score.

6. The method of claim 5, where:
the scoring function is configured to provide a probability distribution over predefined relationship types.

7. The method of claim 6, where:
the scoring function is configured to apply a weighting factor to the probability distribution.

8. The method of claim 7, where:
the weighting factor comprises a traversal depth parameter corresponding to distance between the source node and the destination node.

9. The method of claim 1, where:
predefined known words represent predefined relationships applicable between the graph nodes; and
where analyzing comprises: training a model based on the known words.

10. A database search system for guiding an engineering project, the system comprising:

a database interface to a graph structure comprising:
 graph nodes; and
 explicit relationships defined between the graph nodes, wherein the relationships represent patterns capturing engineering data including engineer experience data, knowledge data, resources, or services; and
a communication interface configured to accept, from a query source, a database prediction query comprising a prediction operator applied to a specific relationship, wherein the database query relates to patterns and pattern components that support the engineering project, including service patterns that capture pattern components for cloud portals, tool patterns that capture pattern components for installed engineering tools, and project patterns that capture pattern components for stored projects;

analysis circuitry configured to:
 analyze, by a linearized classifier, the graph structure to identify a predicted instance of the specific relationship in the graph structure that is not included in the explicit relationships in the graph structure; and
 report the predicted instance of the specific relationship to the query source through the communication interface, wherein the predicted instance identifies a pattern component responsive to the database query for guiding the engineering project.

11. The system of claim 10, where:

the analysis circuitry is further configured to:
 determine a candidate node set comprising a source node and a destination node among the graph nodes;
 determine a candidate path for the specific relationship between the source node and the destination node among the graph nodes; and
 decide that the candidate path qualifies as the predicted instance.

12. The system of claim 11, where:
the analysis circuitry is further configured to determine a score for the candidate path; and
determine whether the score exceeds a predefined threshold.

13. The system of claim 12, where:
the database prediction query further specifies a source node specifier and a destination node specifier among the graph nodes; and
the analysis circuitry is configured to report by returning a search result structure comprising the score, and a graph structure path within the graph database from the source node to the destination node along which the score applies and the predicted instance applies.

14. The system of claim 12, where:
the analysis circuitry is configured to apply a predefined scoring function to generate the score.

15. The system of claim 14, where:
the scoring function is configured to provide a probability distribution over predefined relationship types.

16. The system of claim 15, where:
the scoring function is configured to apply a weighting factor to the probability distribution.

17. The system of claim 16, where:
the weighting factor comprises a traversal depth parameter corresponding to distance between the source node and the destination node.

18. The system of claim 10, where:
the analysis circuitry comprises a set of predefined known words that represents predefined relationships applicable between the graph nodes; and
where the analysis circuitry is further configured to train a model based on the known words.

19. A system for guiding an engineering project using a database of patterns, the system comprising:

a data repository comprising:
 a graph database comprising graph nodes and explicit relationships between the graph nodes chosen from among a set of predefined relationships applicable to the graph nodes, wherein the relationships represent patterns capturing engineering data including engineer experience data, knowledge data, resources, or services; and system circuitry defining:
- a query search interface configured to connect to a query source;
- query processing logic configured to:
  - accept a database prediction query from the query source, the database query comprising a prediction operator applied to a specific relationship in the set of predefined relationships, wherein the database query relates to patterns and pattern components that support the engineering project, including service patterns that capture pattern components for cloud portals, tool patterns that capture pattern components for installed engineering tools, and project patterns that capture pattern components for stored projects; and
  - analyze by a linearized classifier, the graph database to identify a predicted instance of the specific relationship that is not explicitly defined in the graph database; and
- a reporting interface configured to report the predicted instance of the specific relationship to the query source, wherein the predicted instance identifies a pattern component responsive to the database query for guiding the engineering project.

20. The system of claim 19, where:
the query processing logic is further configured to:
- determine a candidate nodeset comprising a source node and a destination node among the graph nodes;
- determine a candidate path for the specific relationship between the source node and the destination node in the candidate nodeset;
- determine a likelihood score that the candidate path matches the specific relationship; and
- generate a search result structure comprising the likelihood score and the candidate path within the graph database from the source node to the destination node along which the score applies; and where:

the reporting interface is configured to report the predicted instance by transmitting the search result structure to the query source.

* * * * *